United States Patent
Vogt et al.

(10) Patent No.: US 7,683,561 B2
(45) Date of Patent: Mar. 23, 2010

(54) DEVICE FOR THE INCREMENTAL CONTROL OF A DIRECT-CURRENT MOTOR FOR THE COOLING FAN OF A MOTOR VEHICLE

(75) Inventors: Richard Vogt, Willstaett (DE); Andreas Ewert, Lichtenau (DE); Michael Strupp, Cheongwon-Gun (KR)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 11/571,903

(22) PCT Filed: Nov. 30, 2004

(86) PCT No.: PCT/EP2004/053164

§ 371 (c)(1),
(2), (4) Date: Jan. 10, 2007

(87) PCT Pub. No.: WO2006/034733

PCT Pub. Date: Apr. 6, 2006

(65) Prior Publication Data

US 2008/0002953 A1 Jan. 3, 2008

(30) Foreign Application Priority Data

Sep. 28, 2004 (DE) ........................ 10 2004 046 900

(51) Int. Cl.
*H02P 6/16* (2006.01)
(52) U.S. Cl. .................. 318/400.07; 318/772; 318/432
(58) Field of Classification Search ................. 318/772, 318/432, 778, 400.07, 434; 388/800, 806, 388/815
See application file for complete search history.

(56) References Cited

U.S. PATENT DOCUMENTS

| 3,638,718 | A | | 2/1972 | Illg |
| 4,112,338 | A | | 9/1978 | Kawasaki |
| 4,955,431 | A | * | 9/1990 | Saur et al. .................... 165/271 |
| 4,988,930 | A | * | 1/1991 | Oberheide ................... 318/82 |
| 5,134,351 | A | | 7/1992 | Msihid |
| 6,037,732 | A | * | 3/2000 | Alfano et al. ............... 318/471 |
| 6,351,601 | B1 | * | 2/2002 | Judkins, III ................. 388/815 |
| 6,368,064 | B1 | * | 4/2002 | Bendikas et al. ............... 417/2 |
| 2003/0091344 | A1 | * | 5/2003 | Vogt et al. ................... 388/827 |

FOREIGN PATENT DOCUMENTS

| DE | 35 43 207 | 6/1987 |
| DE | 90 13 386 | 11/1990 |
| EP | 0 445 015 | 9/1991 |
| EP | 0 518 538 | 12/1992 |
| EP | 1 017 158 | 7/2000 |
| EP | 1 375 326 | 1/2004 |
| GB | 2 041 677 | 9/1980 |
| JP | 55-50813 | 4/1980 |
| JP | 61092192 | 5/1986 |

* cited by examiner

*Primary Examiner*—Rina I Duda
(74) *Attorney, Agent, or Firm*—Michael J. Striker

(57) ABSTRACT

The invention relates to a device (10) for the incremental control of at least one first direct-current motor (12) for the cooling fan of a motor vehicle. Said device comprises a first (14) and a second current-limiting component (16), and a first (22), a second (24) and a third switching element (28). The inventive device is characterized in that the switching elements (22, 24, 28) connect the first (14) and the second current-limiting component (16) in such a manner that the cooling capacity of the cooling fan can be varied in at least four levels different from zero.

16 Claims, 2 Drawing Sheets

Figure 1:
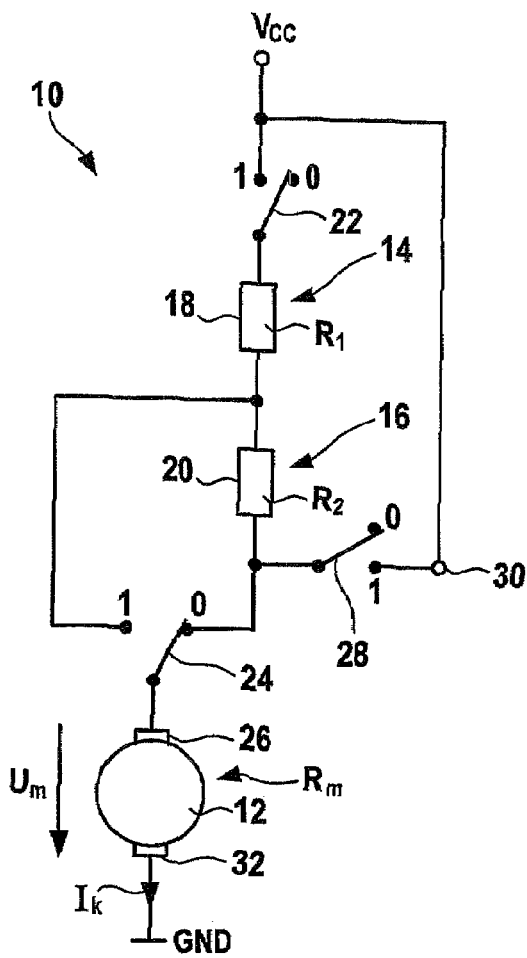

DEVICE FOR THE INCREMENTAL CONTROL OF A DIRECT-CURRENT MOTOR FOR THE COOLING FAN OF A MOTOR VEHICLE

CROSS-REFERENCE TO RELATED APPLICATION

The invention described and claimed hereinbelow is also described in German Patent Application DE 10 2004 046 900.8 filed on Sep. 28, 2004. This German Patent Application, whose subject matter is incorporated here by reference, provides the basis for a claim of priority of invention under 35 U.S.C. 119(a)-(d).

BACKGROUND OF THE INVENTION

The present invention relates to a define for incremental control of at least one direct-current motor for a cooling fan of a motor vehicle.

Publication EP 1 017 158 A2 makes known a device for controlling the starting phase of a direct-current motor for a cooling fan of a motor vehicle, with which the speed of the direct-current motor can be varied in four stages using three resistors that can be connected in series using a relay. The device also includes a temperature-dependent switch for controlling the direct-current motor.

Furthermore, publication EP 0 445 015 A1 makes known a method for attaining different speed stages of a direct-current motor for a cooling fan via connection with several pairs of brushes. According to EP 518 538 A2, a continual speed adjustment is attained via control using pulse-width modulated (PWM) signals.

SUMMARY OF THE INVENTION

In contrast to the related art described above, the inventive device for the incremental control of at least one direct-current motor for a cooling fan of a motor vehicle with a first and second current-limiting component and with a first, second, and third switching element has the advantage that the cooling capacity of the cooling fan can be varied in at least four non-zero stages using only two current-limiting components and three switching elements. In a particularly advantageous manner, the first and second current-limiting components can be operated individually or in a series connection or a parallel connection. To this end, the first and second current-limiting components are connected using the three switching elements in a manner such that the first current-limiting component can be connected to a supply voltage using the first switching element, and to a first contact of the direct-current motor using the second switching element, the second current-limiting component can be connected to the supply voltage using the third switching element, and to the first contact of the direct-current motor using the second switching element, and the first and second current-limiting components can be connected to the supply voltage in a parallel connection using the first and third switching elements, and to the first contact of the direct-current motor using the second switching element, and the first and second current-limiting components can be connected to the supply voltage and to the first contact of the direct-current motor using the first and second switching elements in a series connection. The inventive device is therefore a cost-favorable alternative to known devices with which it is possible to realize a maximum of only two non-zero stages using three switching elements and two current-limiting components, or—as described in publication EP 1 017 158 A2 mentioned above—to realize a maximum of only three different, non-zero stages using three switching elements and three current-limiting components. In contrast to PWM control—as is made known in EP 518 538 A2—the present invention also reduces costs by eliminating the expensive PWM controller.

In an advantageous embodiment, the first and second current-limiting components are a first resistor with a first resistance value $R_1$, and a second resistor with a second resistance value $R_2$. The two resistance values, $R_1$ and $R_2$, must be dimensioned such that a calculated first quotient $$Q_1 = \frac{R_1}{R_1 + R_2}$$

is approximately in a range between 50% and 100%. This makes it possible to subdivide the desired cooling capacity/speed range into evenly-spaced increments, particularly for normal motor vehicle operation. Subdivision into evenly-spaced increments is attained when first quotient $Q_1$ is 62%. If the highest possible values are selected for $R_1$ and $R_2$, the starting current of the inventive device can be reduced markedly.

A further aspect of the present invention results from the consideration of a second quotient, $$Q_2 = \frac{R_1 + R_2}{R_m},$$

with which the cooling capacity/speed range can be varied to the greatest extent possible; $R_m$ is a motor resistance value of the direct-current motor. For this purpose, it is advantageous when $Q_2$ is between 1 and 10.

In an alternative embodiment, the inventive device can also be used, with slight modifications, to control two direct-current motors, e.g., for a twin cooling fan of a motor vehicle. To this end, the first current-limiting component is a resistor, and the second current-limiting component is a second direct-current motor. The first and second direct-current motors can be operated individually or in a series connection or a parallel connection.

The connection using the three switching elements takes place in a manner such that a first contact of the first direct-current motor can be connected to a supply voltage using the first and second switching elements via the resistor, the first contact of the first direct-current motor can be connected to a second contact of the first direct-current motor using the second and third switching elements, a first contact of the second direct-current motor can be connected to the supply voltage using the first switching element via the resistor, and a second contact of the second direct-current motor can be connected to the second contact of the first direct-current motor using the third switching element, and the first and second direct-current motors can be connected in a series or parallel connection using the second and third switching elements.

The outlay and costs for the inventive device for the incremental control of the twin cooling fan can be reduced further when the resistor has a resistance value that is nearly zero ohms. This also allows the first and/or second direct-current motor to be operated with maximum torque.

A further advantage of the present invention results when a fourth switching element is connected in parallel with at least one direct-current motor, since, when the switching element is closed, it is possible to brake the direct-current motor quickly after the inventive device is deactivated.

Finally, it is advantageous when a thermal protective element is assigned to at least one switching element, to prevent damage to the blower motors caused by excessive current. To this end, the thermal protective element can be connected upstream of the switching element in the control circuits and/or in the load circuits.

Further advantages of the present invention result from the features described in the dependent claims, and from the drawing and the description, below.

The present invention is described below as an example, with references to FIGS. 1 through 4. Identical components having the same mode of operation are labelled with the same reference numerals.

BRIEF DECRIPTION OF THE DRAWINGS

Figure 2:
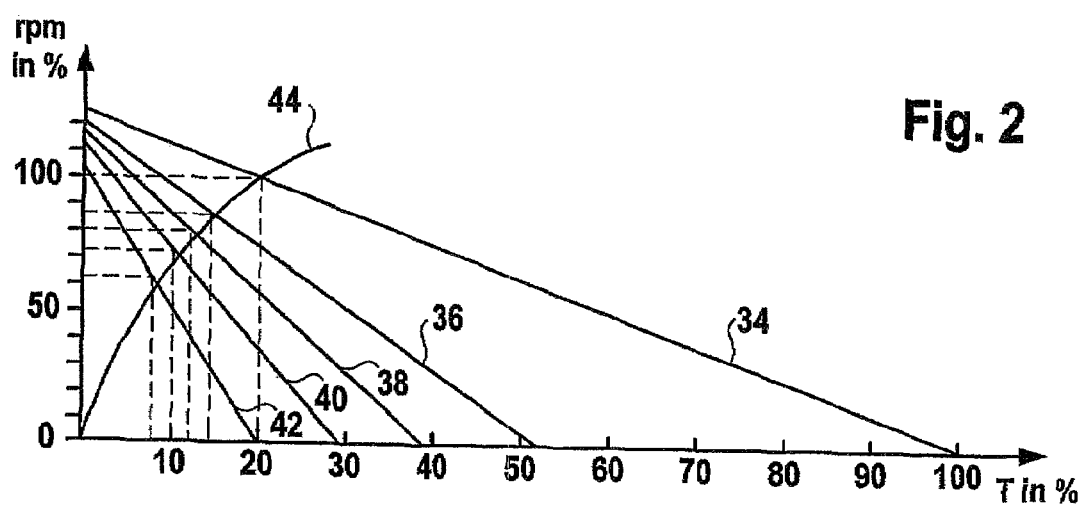
Figure 3:
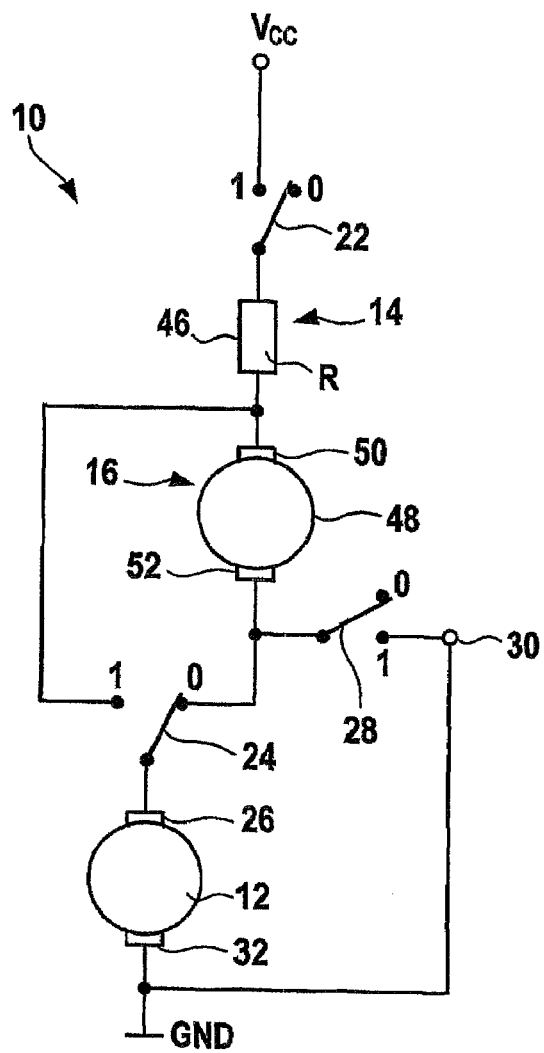
Figure 4A:
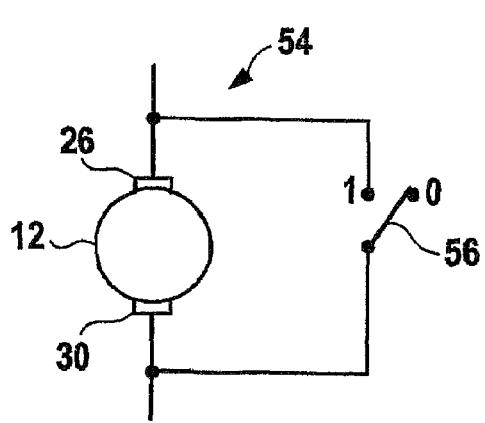
Figure 4B:
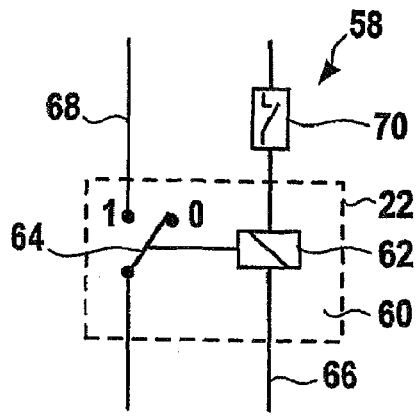

FIG. 1 shows a block diagram of a first exemplary embodiment of the inventive device, FIG. 2 shows a diagram of the speed and cooling capacity characteristics as a function of the different stages of the inventive device according to the first exemplary embodiment, FIG. 3 shows a block diagram of a second exemplary embodiment of the inventive device, and FIG. 4 shows block diagrams of a braking circuit (FIG. 4a) and a protective circuit (FIG. 4b) for the inventive device.

DESCRIPTON OF THE PREFERRED EMBODIMENTS

FIG. 1 shows the block diagram of inventive device 10 for the incremental control of a direct-current motor 12 for a cooling fan of a motor vehicle. Device 10 includes a first current-limiting component 14 and a second current-limiting component 16. Both components 14 and 16 are designed as resistors 18 and 20 with a first resistance value $R_1$ and a second resistance value $R_2$. Other current-limiting components 14 and 16 with corresponding resistance values can also be used, however. They can be, e.g., the coils of further direct-current motors, varistors, diodes, or the like. In the following, first exemplary embodiment, however, it is assumed that there is first and a second ohmic resistor 18 and 20.

First resistor 18 can be connected to a supply voltage ($V_{cc}$) using a first switching element 22, which has the two switch positions 0 (open) and 1 (closed), and it can be connected to a first contact 26 of direct-current motor 12 using a second switching element 24, which can be switched between a position 0 and a position 1. Second resistor 20 can be connected to supply voltage $V_{cc}$ using a third switching element 28—which, like first switching element 22, has the two switch positions 0 (open) and 1 (closed)—via a junction 30, and it can be connected to first contact 26 of direct-current motor 12 using second switching element 24. It is also possible to connect first and second resistors 18 and 20 in a parallel connection to supply voltage $V_{cc}$ using first and third switching elements 22 and 28, and to connect them to first contact 26 of direct-current motor 12 using second switching element 24. Finally, first and second resistors 18 and 20 can be connected to supply voltage $V_{cc}$ and to first contact 24 of direct-current motor 12 in a series connection using first switching element 22 and second switching element 24.

According to FIG. 1, a second contact 32 of direct-current motor 12 is connected with an electrical ground GND. In addition, direct-current motor 12 has a motor resistance value $R_m$ that is calculated—when there is no external resistance connection—using the equation $R_m = U_m/I_k$, in which $U_m$ is the motor voltage drop across direct-current motor 12, and $I_k$ is a short-circuit current.

According to Table 1, it is now possible—using resistors 18 and 20, which have resistance values $R_1$ and $R_2$, and three switching elements 22, 24, and 28—to set five non-zero cooling capacity stages. Direct-current motor 12 enters the shut-off state (off), which is equal to zero, when first and third switching means 22 and 28 are in position 0. In this stage, the control status of second switching element 24 does not play a role, and is therefore labeled with an asterisk (*).

TABLE 1

| Cooling capacity | 22 | 24 | 28 | Resultant resistance value |
|---|---|---|---|---|
| off | 0 | * | 0 | — |
| low | 1 | 0 | 0 | $R_1 + R_2$ |
| middle 1 | 1 | 1 | 0 | $R_1$ |
| middle 2 | 0 | 1 | 1 | $R_2$ |
| middle 3 | 1 | 1 | 1 | $R_1 \| R_2$ |
| high | * | 0 | 1 | 0 |

A low cooling capacity ("low") results when first switching element 22 is switched to position 1, and second and third switching elements are both located in position 0. This switch position results in a series connection of resistors 18 and 20, thereby resulting in a resistance value $R_1+R_2$, which results in a relatively high voltage drop across the series connection. A first moderate cooling capacity ("middle 1") results when first switching element 22 is in position 1, second switching element 24 is in position 1, and third switching element 28 is in position 0. In this case, direct-current motor 12 only sees resistance value $R_1$ of first resistor 18. If, on the other hand, first switching element 22 is set to position 0 and the two remaining switching elements 24 and 28 are each set to position 1, a second moderate cooling capacity ("middle 2") results, with a resultant resistance value $R_2$. A third moderate cooling capacity ("middle 3") can be selected when all three switching elements 22, 24, and 28 are in position 1, thereby resulting in a parallel connection of resistors 18 and 20, with a resultant resistance value of $R_1 \| R_2 = R_1 \cdot R_2/(R_1+R_2)$. When second switching element 24 is in position 0 and third switching element 28 is in position 1, the two resistors 18 and 20 are bridged, and direct-current motor 12 runs at the highest speed which, in turn, results in a high cooling capacity. In this case, the switch position of first switching element 22 is redundant, and is therefore labeled with an asterisk (*). FIG. 2 shows a family of characteristics of the speed (rpm) of direct-current motor 12, and the blower of the cooling fan, which is driven by said direct-current motor but is not shown, as a function of torque T. With reference to Table 1, the characteristics of direct-current motor 12 are shown for the stages with high cooling capacity 34, with third middle cooling capacity 36, with second middle cooling capacity 38, with first middle cooling capacity 40, and with low cooling capacity 42. FIG. 2 also shows a non-linear characteristic 44 of the blower that is driven by direct-current motor 12. The interesting aspects are the points of intersection of characteristic 44 with characteristics 34, 36, 38, 40, and 42. When, e.g., cooling capacity is high, as indicated by the point of intersection of characteristics 34 and 44, a torque T of approximately 20% is produced at a speed rpm of direct-current motor 12 of 100%, while, when cooling capacity is low, as indicated by the point of intersection of characteristics 42 and 44, a torque T of approximately 8% is provided at a speed rpm of approximately 63%. The goal is to design the subdivisions between the individual points of intersection of the characteristics to be as evenly spaced as possible. This is accomplished when a first quotient, $$Q_1 = \frac{R_1}{R_1 + R_2},$$

which is calculated using resistance values $R_1$ and $R_2$, is between approximately 50% and 100%. The most evenly-spaced subdivision for $Q_1$ was found to be ≈62%. This depends on the resistance values that were selected for $R_1$ and $R_2$, however. Although the starting current can be reduced markedly by using the highest possible resistance value $R_1+R_2$, this resistance value also directly affects the speed range of direct-current motor 12, which can vary between wide limits with consideration for a second quotient, which is dependent on motor resistance value $R_m$ $$Q_2 = \frac{R_1 + R_2}{R_m}$$

Second quotient $Q_2$ should be selected such that it is between 1 and 10.

FIG. 3 shows the block diagram of a second exemplary embodiment of inventive device 10 for the incremental control of at least a first direct-current motor 12 for a cooling fan of a motor vehicle. First current-limiting component 14 is a resistor 46 with a resistance value R, and second current-limiting component 16 is a second direct-current motor 48 with a first and second contact 50 and 52. In contrast to the first exemplary embodiment, junction 30 is not connected with supply voltage $V_{cc}$. Instead, it is connected with second contact 32 of first direct-current motor 12. The second exemplary embodiment shows that, by replacing a few components and making a small modification to the circuit, it is possible to also use device 10 according to the first exemplary embodiment, e.g., for a twin cooling fan of a motor vehicle.

Device 10 is now designed such that first contact 26 of first direct-current motor 12 can be connected to supply voltage $V_{cc}$ using first and second switching elements 22 and 24 via resistor 46. Furthermore, first contact 26 of first direct-current motor 12 can be connected to second contact 32 of first direct-current motor 12 using the second and third switching elements 24 and 28. It is also possible to connect first contact 50 of second direct-current motor 48 to supply voltage $V_{cc}$ using first switching element 22 via resistor 46, and second contact 52 of second direct-current motor 48 can be connected to second contact 32 of first direct-current motor 12 using third switching element 28. Finally, it is possible to operate first and second direct-current motors 12 and 48 in either a series or parallel connection using second and third switching elements 24 and 28.

Resistor 46 can have, e.g., a very small resistance value R, and it can be used as a shunt for measuring current. Likewise, R can also have a value of nearly zero ohms, so that first component 14 serves as a bridge.

The stages for the cooling capacity of the twin fan that can be attained with device 10 according to the second exemplary embodiment are shown in Table 2, below. As indicated, the shut-off state (off) of the twin fan results when first switching element 22 is switched to position 0 (open). The positions of the two remaining switching elements 24 and 28 are redundant in this case, so they are labeled with an asterisk (*). The twin fan is set into operation by moving first switching element 22 into position 1 (closed). It is now possible to select four non-zero stages, depending on the positions of second and third switching elements 24 and 28.

TABLE 2

| Cooling capacity | 22 | 24 | 28 | Direct-current motor |
|---|---|---|---|---|
| off | 0 | * | * | — |
| middle 1 | 1 | 0 | 1 | only 48 |
| middle 2 | 1 | 1 | 0 | only 12 |
| middle 3 | 1 | 0 | 0 | 12 and 48 in series |
| high | 1 | 1 | 1 | 12 and 48 in parallel |

A first moderate cooling capacity ("middle 1") can be attained, e.g., using position 0 of second switching element 24 and position 1 of third switching element 28. The result is that only second direct-current motor 48 operates. If second switching element 24 is moved into position 1, however, and third switching element 28 is moved to position 0, first direct-current motor 12 operates; this results in a second moderate cooling capacity ("middle 2"). A third moderate cooling capacity ("middle 3") results by moving second and third switching elements 24 and 28 to their 0 positions, since both direct-current motors 12 and 48 are now operated in a series connection. Finally, when second and third switching elements 24 and 48 are moved into their 1 positions, both direct-current motors 12 and 48 operate in a parallel connection and produce in high cooling capacity ("high").

FIG. 4a shows the block diagram of a braking circuit 54 for first direct-current motor 12. Using a further switching element 56, it is possible to short-circuit first and second contacts 26 and 30 of direct-current motor 12 by closing switching element 12 immediately after device 10 is brought into its shut-off state, i.e., by moving it from its home position 0 to position 1. A braking circuit 56 is basically not needed for first direct-current motor 12 in the second exemplary embodiment according to FIG. 3, since this function can also be performed by second and third switching elements 24 and 28. For example, first direct-current motor 12 is short-circuited when second switching element 24 is in position 0 and third switching element 28 is in position 1. Braking circuit 54 can also be used for second direct-current motor 48, in the manner depicted in FIG. 4a.

FIG. 4b shows a protective circuit 58 for at least one of the switching elements, e.g, first switching element 22, to protect against overcurrent, which can damage direct-current motors 12 and/or 48. Switching element 22 is designed as a relay 60 with a relay coil 62 and a switch contact 64. Relay coil 62 is located in a control circuit 66, and switch contact 64 is located in a load circuit 68. A thermal protective element 70 is located in control circuit 66, which interrupts control circuit 66 when thermal overload occurs, thereby preventing damage to direct-current motors 12 and/or 48. As an alternative, thermal protective element 70 can also be located in load circuit 68, in order to interrupt it directly. This is practical, e.g., when field effect transistors, MOSFET, or bipolar transistors are used as the switching elements instead of or in addition to the relays.

It is also pointed out that the exemplary embodiments shown are not limited to FIGS. 1 through 4 or to a direct connection of device 10 with supply voltage $V_{cc}$ or electrical ground GND. A shunt for measuring current, or any other type of electrical component, could be located between electrical ground GND and second contact 32 of first direct-current motor 12 or between supply voltage $V_{cc}$ and first switching element 22.

What is claimed is:

1. A device (10) for the incremental control of at least a first direct-current motor (12) for a cooling fan of a motor vehicle with a first current-limiting component (14) and a second current-limiting component (16), and a first (22), second (24) and third switching element (28),
   wherein
   the switching elements (22, 24, 28) connect the first (14) and second current- limiting components (16) in a manner such that the cooling capacity of the cooling fan can be varied in at least four non-zero levels,
   wherein
   the first current-limiting component (14) can be connected to a supply voltage ($V_{cc}$) using the first switching element (22), and to a first contact (26) of the direct-current motor (12) using the second switching element (24),
   the second current-limiting component (16) can be connected to the supply voltage ($V_{cc}$) using the third switching element (28), and to the first contact (26) of the direct-current motor (12) using the second switching element (24),
   the first current-limiting component (14) and second current-limiting component (16) can be connected in parallel to the supply voltage ($V_{cc}$) using the first switching element (22) and the third switching element (28), and
   they can be connected to the first contact (26) of the direct-current motor (12) using the second switching element (24), and
   the first current-limiting component (14) and second current-limiting component (16) can be connected in series to the supply voltage ($V_{cc}$) and to the first contact (26) of the direct-current motor (12) using the first switching element (22) and the second switching element (24).

2. The device as recited in claim 1, wherein the first current-limiting component (14) is a first resistor (18), and the second current-limiting component (16) is a second resistor (20).

3. The device as recited in claim 2, wherein the first resistor (18) has a first resistance value $R_1$, and the second resistor (20) has a second resistance value $R_2$, and a first quotient, $$Q_1 = \frac{R_1}{R_1 + R_2}$$

which is calculated based on first resistance value $R_1$ and second resistance value $R_2$, is located approximately in a range between 50% and 100%.

4. The device as recited in claim 3, wherein the first quotient $Q_1$ is approximately 62%.

5. The device as recited in claim 2, wherein the at least one direct-current motor (12) has a motor resistance value $R_m$, and a second quotient, $$Q_2 = \frac{R_1 + R_2}{R_m}$$

which is calculated based on first resistance value $R_1$, second resistance value $R_2$, and motor resistance value $R_m$, is located approximately in a range from 1 to 10.

6. The device as recited in claim 1, wherein the first current-limiting component (14) is a resistor (46), and the second current-limiting component (16) is a second direct-current motor (48).

7. The device as recited in claim 6, wherein the first direct-current motor (12) and second direct-current motor (48) can be operated individually or in a series connection or a parallel connection.

8. The device as recited in claim 6, wherein the resistor (46) has a resistance value R ≈0 ohm.

9. The device as recited in claim 1, wherein a thermal protective element (70) is assigned to at least one switching element (22, 24, 28).

10. The device as recited in claim 1, wherein the switching elements (22, 24, 28) are designed as a relay (60) and/or MOSFET and/or FET and/or bipolar transistors.

11. The device as recited in claim 1, wherein a fourth switching element (56) is connected in parallel with the at least one direct-current motor (12, 48).

12. A device (10) for the incremental control of at least a first direct-current motor (12) for a cooling fan of a motor vehicle with a first current-limiting component (14) and a second current-limiting component (16), and a first (22), second (24) and third switching element (28),
   wherein
   the switching elements (22, 24, 28) connect the first (14) and second current- limiting components (16) in a manner such that the cooling capacity of the cooling fan can be varied in at least four non-zero levels,
   wherein
   the first current-limiting component (14) is a resistor (46), and the second current- limiting component (16) is a second direct-current motor (48),
   wherein
   a first contact (26) of the first direct-current motor (12) can be connected to a supply voltage ($V_{cc}$) using the first switching element (22) and second switching element (24) via the resistor (46),
   the first contact (26) of the first direct-current motor (12) can be connected to a second contact (32) of the first direct-current motor (12) using the second switching element (24) and the third switching element (28),
   a first contact (50) of the second direct-current motor (48) can be connected to the supply voltage ($V_{cc}$) using the first switching element (22) via the resistor (46), and a second contact (52) of the second direct-current motor (48) can be connected to the second contact (32) of the first direct-current motor (12) using the third switching element (28),
   the first direct-current motor (12) and second direct-current motor (48) can he connected in series or parallel using the second switching element (24) and third switching element (28).

13. The device as recited in claim 12, wherein the resistor (46) has a resistance value R ≈0 ohm.

14. The device as recited in claim 12, wherein a thermal protective element (70) is assigned to at least one switching element (22, 24, 28).

15. The device as recited in claim 12, wherein the switching elements (22, 24, 28) are designed as a relay (60) and/or MOSFET and/or FET and/or bipolar transistors.

16. The device as recited in claim 12, wherein a fourth switching element (56) is connected in parallel with the at least one direct-current motor (12, 48).

* * * * *